United States Patent [19]
Hoffmann et al.

[11] 3,861,574
[45] Jan. 21, 1975

[54] APPARATUS FOR THE PRODUCTION AND/OR TESTING OF WELDED HELICAL SEAM PIPE

[76] Inventors: Ralf Hoffmann, Im Hilger 12, Dortmund-Solde; Werner Wennemann, Wildbannweg 51, Dortmund-Kirchhorde, both of Germany

[22] Filed: Feb. 28, 1974

[21] Appl. No.: 446,761

Related U.S. Application Data

[62] Division of Ser. No. 341,281, March 14, 1973.

[30] Foreign Application Priority Data
Mar. 15, 1972 Germany............................ 2212382

[52] U.S. Cl.................. 228/9, 219/125 PL, 228/15
[51] Int. Cl............................................. B23k 31/02
[58] Field of Search............ 288/8, 9, 15; 29/477.3, 29/484; 219/125 PL, 61, 62

[56] References Cited
UNITED STATES PATENTS

| | | | |
|---|---|---|---|
| 3,207,407 | 9/1965 | Preston et al................. | 219/125 PL |
| 3,360,177 | 12/1967 | Enkvist........................ | 219/125 PL |
| 3,594,540 | 7/1971 | Weinfurt....................... | 228/9 X |
| 3,735,478 | 3/1973 | Porter et al..................... | 29/477.3 |

*Primary Examiner*—Francis S. Husar
*Attorney, Agent, or Firm*—Toren, McGeady and Stanger

[57] ABSTRACT

A method of producing welded helical seam pipe, made from steel sheet or strip which is wound into pipe formation, is disclosed. Prior to the welding of the wound steel sheet, an optically scannable reference line is applied to the steel sheet which extends parallel to and adjacent one of the edges of the sheet. The welding is effected by applying a first welding seam with a first welding head located within the pipe interior and a second welding seam with a second welding head located outside the pipe. In accordance with the invention, the optically scannable reference line is applied to that face of the sheet which forms the inner surface of the welded pipe. The thus interiorly located reference line is optically scanned so as to obtain scanning information which, through operative connection to control means, controls the welding movements or operation of both the first and the second welding heads. The inventive method is particularly suitable in the production of pipe which is tack-welded prior to finish welding.

5 Claims, 4 Drawing Figures

APPARATUS FOR THE PRODUCTION AND/OR TESTING OF WELDED HELICAL SEAM PIPE

This is a division of application Ser. No. 341,281 filed Mar. 14, 1973.

The application also discloses apparatus for carrying out the inventive procedure. This apparatus includes optical scanning means located within the pipe for scanning the reference line and means for operatively connecting the optical scanning means with the first and second welding heads for controlling the heads in dependence on the scanning information received by said optical scanning means. The procedure is also applicable to the testing of the welding seams, in which event the welding heads are replaced by testing heads, or both welding heads and testing heads are supplied.

FIELD OF INVENTION

The invention is directed to a method and apparatus for producing and/or testing welded helical seam pipe made from steel sheet or strip (hereinafter collectively referred to as "steel sheet").

BACKGROUND INFORMATION

In the manufacture of welded helical seam pipe, an extraneous or auxiliary welding material is customarily used for the production of the seams and the welding proper is thus ordinarily effected by electric arc welding. The quality of the welding seams produced by the arc welding is very much dependent on two factors. The first factor, which is decisive for the quality of the welding seams, is that the width of the welding gap between the edge portions of the sheet to be welded is maintained constant throughout the welding operation. The second factor, which is also of considerable importance, requires that the welding head, by means of which the welding electrode and the welding current are supplied, is constantly maintained in position above the center of the welding gap.

A number of optical and mechanical procedures have previously been proposed for maintaining the width of the welding gap constant during the welding. These known procedures, which thus deal with the first mentioned factor, are generally satisfactory and are widely used in the industry. However, it is more difficult to satisfy the second factor referred to, to wit, to control the movement of the welding head, so that it constantly is situated above the center of the welding gap.

A number of proposals for solving this last mentioned task have previously been made. According to these proposals, a a reference of marking line — hereinafter "reference line" — is produced on the steel sheet prior to the welding, the reference line extending parallel to and spaced from one edge of the sheet. This reference line is then optically scanned or sensed and the scanning information obtained is fed to an operatively connected follower control mechanism which, in dependence on the scanning information, adjusts or aligns at least one welding head so as to be positioned above the center of the welding gap. This procedure can in equal or similar manner also be used for testing the welding seams and, accordingly, the invention is directed both to the production of welding seams and also to their testing. The above-described procedure in which an optically scanned reference line is used, has yielded satisfactory results. Prior to this invention, this prior art procedure has, from a practical point of view, been carried out by applying to the outer face of the steel sheet either a colored line or marking or by adhering a previously colored strip parallel to one edge of the sheet.

This known procedure, of course, requires that the reference line is clearly recognizable by the optical scanning means throughout its length since otherwise the purpose of the arrangement would be defeated. In practice, the optical scanning head is situated in the immediate vicinity of the location at which the welding is effected or at which the welding seam is to be tested. After application of the reference line — which customarily is effected before the sheet has been coiled or wound into pipe formation —, the pipe passes, prior to welding and testing, the so-called "pipe former," to wit, the pipe forming means, which twists or winds the sheet in helical manner. The welding is then effected by applying a first welding seam from inside the pipe and a second welding seam from the outside.

The prior art procedure referred to above is exclusively directed to the formation of helical seam pipe, wherein the welding of the pipe is effected in the pipe former prior to the cross-cutting of the pipe into individual lengths. In other words, the prior art procedure is adapted for the optical scanning of exteriorly applied reference lines wherein the welding is effected as a one-step procedure in a pipe forming means prior to the cutting of the pipe into lengths. In this known procedure, the control of the movements of the welding head which is located within the pipe space and that of the welding head which is located outside the pipe, are effected separately, to wit, the movements of the interiorly located welding head which applies the inner seam are independent and distinct from the movements of the exteriorly located head which produces the other seam. The control of the movements of the interiorly located welding head may be effected in known manner, as for example, disclosed in German Pat. No. 1,444,218, to which reference is had. By contrast, the movements of the exteriorly located welding head are controlled independently therefrom and in response to the scanning information obtained from the exteriorly applied optically scanned reference line.

While this previously proposed control procedure is satisfactory when helical seam pipe is produced by a one-step welding procedure as described, experience has demonstrated that it is totally unsatisfactory when helical seam pipe is manufactured according to the so-called "tack welding" procedure which is a two-step welding method. In the tack welding procedure, with which this invention is primarily concerned, the edges of the steel sheet, prior to the ultimate finish welding, are first connected to each other in the pipe former by tack or spot welding at spaced locations, whereupon the thus provisionally joined pipe structure, and customarily after cross-cutting into the desired lengths, is subsequently conveyed to a finish welding station where the finish welding is effected. This finish welding is customarily performed by applying both an inner welding seam and an outer welding seam, to wit, one seam which is applied by a welding head located within the interior of the piper and a second seam which is produced by a welding head located outside the pipe. In this tack welding procedure, however, the danger exists that a reference line which has been applied to the exterior surface of the steel sheet, and which thus extends on the exterior of the tacked provisional pipe body, is damaged during transportation to the finish welding station. If such damage occurs, the movements of the exteriorly located welding head can no longer accurately be controlled in dependence on the optical scanning information. Further, it has not previously been possible satisfactorily to control the movements of the interiorly located welding head during the finish welding procedure. For this reason, in tack welding, the application of an independent free inner welding seam has not been feasible.

SUMMARY OF THE INVENTION

It is the primary object of this invention to overcome the disadvantages and drawbacks of the prior art procedures for producing and/or testing helical seam pipe and to provide a procedure for the finish welding of previously tack-welded pipe structures which results in pipes of superior seam quality.

It is also an object of this invention to provide apparatus for carrying out the inventive procedure.

Generally, it is an object of the invention to improve on the art of producing welded helical seam pipe.

Thus, the invention is primarily directed to a procedure for the finish welding of previously tack-welded helical seam pipe structures which, preferably, have been cross-cut into desired lengths. The invention makes use of an optically scannable reference line of the kind previously indicated, the information obtained by optical scanning or sensing of the reference line being utilized both for the control of at least one interiorly located welding head and also for the control of at least one exteriorly located welding head.

In accordance with the invention, the danger of damage to the reference line is entirely eliminated and reference lines produced by coloring the steel sheet proper or by applying a previously colored flexible band or strip to the steel sheet may be employed.

Briefly, and in accordance with this invention, the above objects are superiorly obtained by applying the reference line to the steel sheet prior to the tack welding and to that face of the sheet which in the ultimate pipe structure forms the inner face of the pipe, the optical scanning information obtained as a result of the scanning being utilized during the finish welding so as to control and align at least one interiorly located welding head and also at least one exteriorly located welding head.

Thus, the inventive procedure is directed to a method of producing welded helical seam pipe made from steel sheet wound into pipe formation, wherein, prior to the welding of the wound sheet, an optically scannable reference line is applied to the steel sheet which extends parallel to and adjacent one of the edges of the steel sheet and wherein the welding is effected by applying a first welding seam with a first welding head located within the pipe and a second welding seam with a second welding head located outside the pipe, the invention proposing that the optically scannable reference line is applied to that face of the sheet which, in the welded pipe structure, is located within the pipe and wherein the reference line is optically scanned to obtain scanning information which controls the welding movements of both the first and second welding heads in dependence on said scanning information.

In a preferrred embodiment of the invention, the welding operation is carried out in two stages. After application of the reference line, the wound sheet is first tack-welded and is then transferred to a finish welding station where finish welding by means of the outer and inner welding heads is performed.

As previously stated, the invention is also concerned with apparatus for carrying out the inventive procedure. According to this apparatus aspect of the invention, the optical scanning means includes a first optical scanning head, whose scanning information controls the interiorly located welding head and also a second optical scanning head whose information controls the exteriorly located welding head. The first and second scanning heads are located within the pipe space and they, as well as the inwardly located welding head, are mounted in slides. These slides are slidable in a direction parallel to the axis of the pipe in stationary rail guides of an inner arm member which is height-adjustable. The slides are coupled to suitable driving means. The exteriorly located welding head is also mounted on a slide which is movable in a guide rail and which is coupled to suitable driving means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
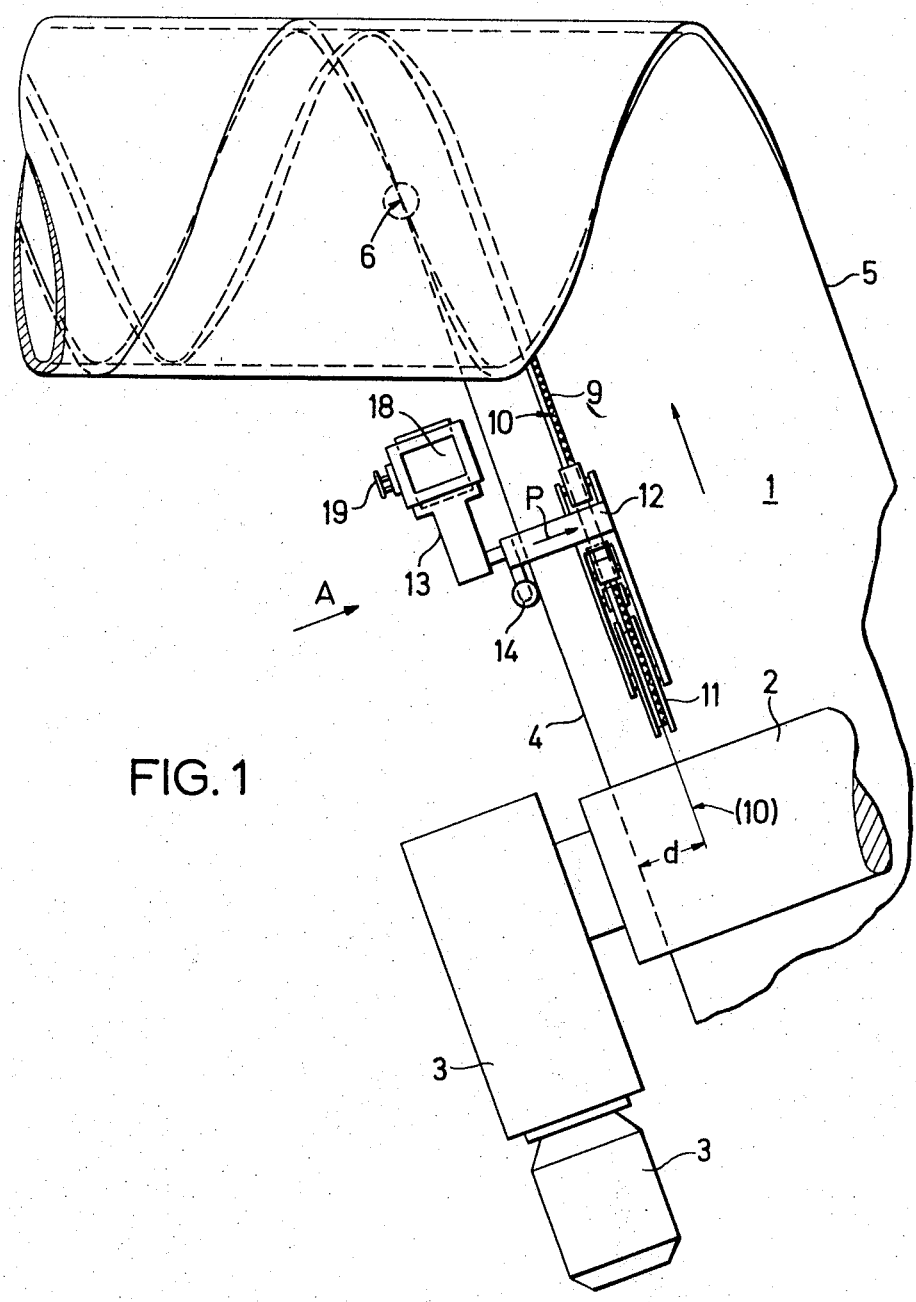
FIG. 1 is a somewhat diagrammatical representation of an arrangement for forming or winding a steel sheet into pipe — the pipe former proper not being shown —, as well as of the tack-welding, the representation being directed to an embodiment in which the reference line is applied in the form of a previously colored flexible strip.

Referring now to the drawings, and in particular FIG. 1, reference numeral 1 generally indicated the strip-shaped steel sheet from which the pipe to be produced is wound in helical manner and whose adjoining or juxtaposed edge portions are to be welded by applying the welding seams. According to FIG. 1, the strip-shaped steel sheet 1 is inserted by means of a driving means into a pipe former. The driving means comprises two rollers 2, which engage the opposite surfaces of the steel strip, as well as motor 3 operatively connected to the rollers 2 to cause them to rotate. The driving means 2,3 pushes the steel sheet 1 into the pipe former in which the sheet is wound in helical formation, as seen on top of FIG. 1. The structural details of such a pipe former are well known in the art and have not been shown in order not to crowd the drawings. The structure of the pipe former does not form part of this invention.

The two edge portions 4 and 5 of the wound steel strip 1 which are to be welded together, are in directly opposing relationship for the first time in the pipe former at the point indicated by reference numeral 6. In point 6 or just ahead of or beyond point 6, the edge portions 4 and 5 are subjected to tack-welding. To this end, a welding head (not shown) is situated above point 6 or in its vicinity, which welding head tack-welds the edges 4,5 of the sheet 1 to form a provisional connection. After a further half rotation of the pipe which is in the processs of being formed, a second tack-welding may be performed by a second welding head which likewise has not been shown.

After cutting the thus formed pipe structure into desired lengths, the tacked pipe length is moved to the finish welding station where it is rotated about its longitudinal axis for performing the finish welding operation.

Figure 2:
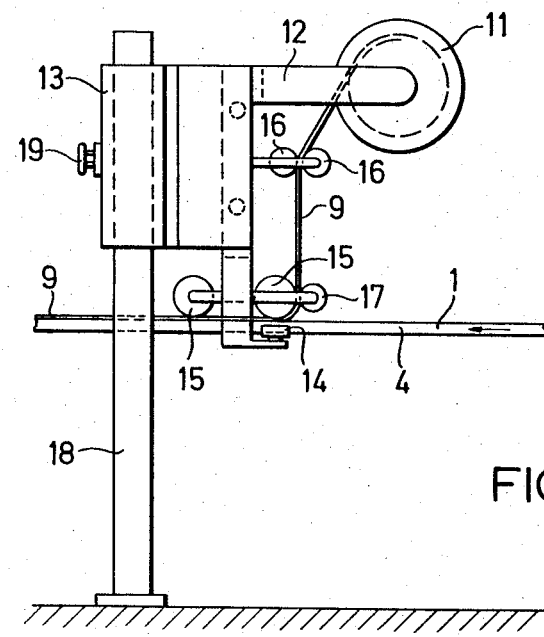
FIG. 2 is an elevation seen in the direction of the arrow A of FIG. 1.

In order to control the movements of the welding heads 7 and 8 at the finish welding station (see FIG. 4), an optically scannable narrow flexible strip 9 is used in the embodiments of FIGS. 1 and 2. This strip 9 is adhesively adhered to the inner face of the steel sheet 1 and for this purpose has an adhesive layer on the side which faces the sheet 1. This adhesive layer causes the adhesive connection between the strip 9 and the surface of the sheet 1. On its opposite side or face, the strip 9 is provided with the reference line 10 which is indicated in FIG. 1 and which extends longitudinally and along the center of the strip 9. This reference line is rendered optically recognizable or visible by, for example, coloring the strip 9 with a light color at the area to the left of the reference line 10 while the coloration to the right of the reference line 10 is dark. This is indicated in FIG. 1. The strip 9 is drawn from a supply roll 11 which latter is mounted on a slide 12. The slide is movable transverse to the steel edge 4 in the direction of the arrow p (see FIG. 1). The slide 12, in turn, is mounted in a block member 13 and with its roller 14 is constantly urged or pressed against the edge 4 of the steel sheet 1 by means of a spring (not shown). In addition to the roller 14, the slide 12 carries two rollers 15 (see FIG. 2) which press the strip 9 with constant pressure against the surface of the steel sheet 1. The adhesive connection between the steel sheet 1 and the strip 9 is thus accomplished. The strip 9 is supplied to the inner surface of the steel sheet 1 through a pair of deflecting rollers 16 and by means of roll 17 which cooperates or coacts with one of the roller 15. The block member 13 is vertically adjustable on a pillar or column 18 and can be fixed in position by means of a clamping screw 19 at any desired level so that the pressure, with which the roller 15 act on the strip 9, can be suitably adjusted or set after the steel sheet 1 has entered the arrangement and the strip 9 has been threaded in.

Figure 3:
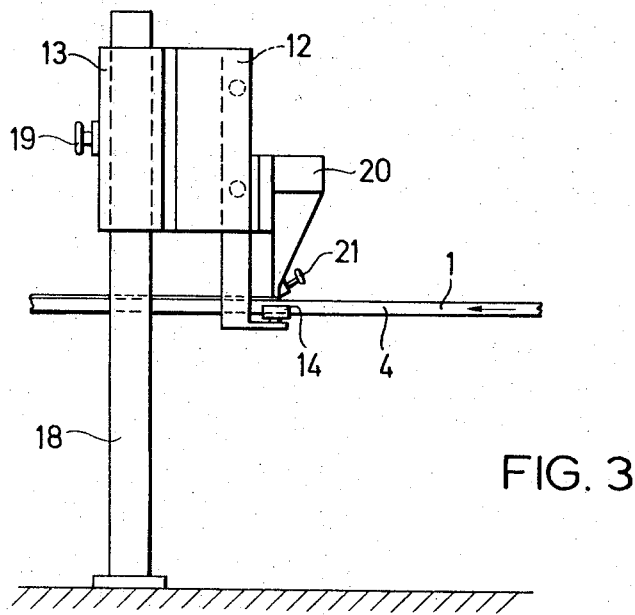
FIG. 3 is a view corresponding to that of FIG. 2, however, directed to an embodiment wherein the reference line is produced by direct coloration of the steel sheet which later on is shaped into pipe.

Referring now to the embodiment of FIG. 3, it will be noted that the reference line 10 may be produced without the use of a marking strip. Thus, the reference line is formed by applying a colored line directly onto the inner side of the steel sheet 1. In this embodiment, a container 20 is secured to the slide 12, the slide 12 again being maintained in constant engagement with the edge 4 of the steel sheet 1 by means of roller 14 which is under spring action. The container 20 is filled with liquid dye stuff or color and has in its lower portion a narrow outlet opening, the size of which can be adjusted by a setting screw 21. The color which flows through the opening is of a kind that rapidly dries on the steel sheet 1 and produces the desired reference line 10. The embodiment of FIG. 3 otherwise corresponds to that of FIG. 2.

Figure 4:
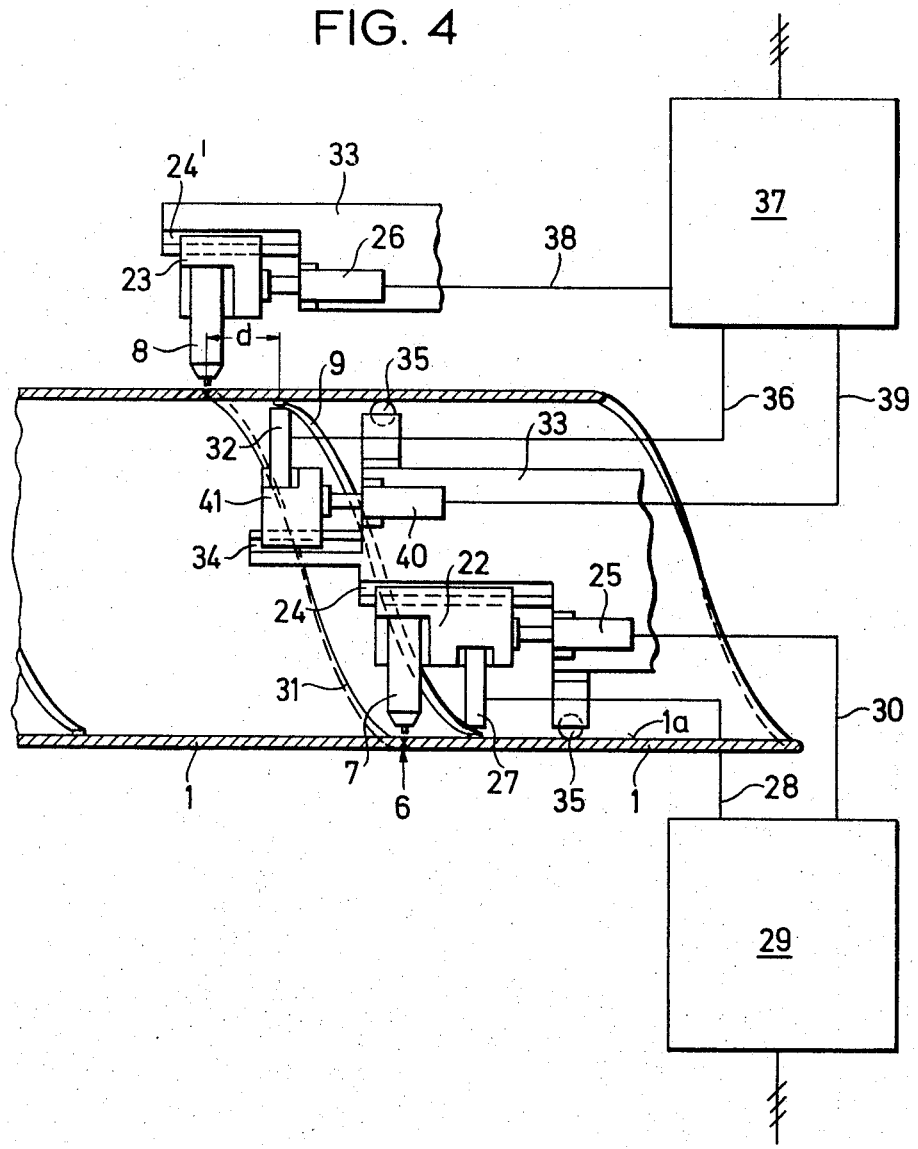
FIG. 4 is a fragmentary view of the finish welding station with the welding heads and scanning means.

The movements of the welding head, or welding heads, and of any seam testing heads which may be provided, are controlled by the optical scanning information which is obtained by optically scanning the reference line 10. It will be noted that the reference line 10 is applied to the inner surface 1a of the steel sheet 1, to wit, that surface which forms the inner surface of the ultimate pipe structure. In this context it is repeated that in prior art constructions the reference line is applied to the outer face of the steel sheet or pipe structure. While the optical scanning and the movement of the welding heads in dependence thereon is known from arrangements wherein the reference line is applied to the outer face of the steel sheet and the arrangement of the present invention generally corresponds to the known arrangement, the fact that the reference line of the present invention is applied to the inner face of the steel sheet, requires that the entire arrangement has to be modified. This becomes clear from FIG. 4. FIG. 4 is directed to an embodiment wherein the finish welding is effected with an interiorly situated welding head 7 and an exteriorly situated welding head 8. It will be appreciated, however, that the same arrangement could be used if additionally one or several seam testing heads were provided since such seam testing heads would be controlled in the same manner as the welding head 8. Accordingly, although the present embodiment does not illustrate and describe seam testing heads, the invention also encompasses embodiments wherein, in addition to the welding heads, testing heads are employed. Moreover, it is feasible within the scope of this invention to use the same arrangement for solely testing already finish welded pipes, in which event the welding heads would simply be replaced by testing heads, the arrangement otherwise being the same.

The welding head 7 is mounted on a slide member 22, while the exteriorly situated welding head 8 is mounted on a slide member 23. The slides 22 and 23 are slidably movable in a direction parallel to the pipe axis. For this purpose, slide 22 is movable within stationary rail guide 24, while stationary rail guide 24' supports slide 23. Further, slide 22 is operatively connected to drive means 25, while slide 23 is moved by drive means 26.

The control of the interiorly located welding head 7 will now be described, since this welding head produces the first welding seam whose position is decisive for the quality of the finished pipe and the further procedure.

The welding head 7, to wit, the welding head located within the pipe space, is associated with an optical scanning head 27, which is also mounted within or on the slide member 22 and which first scans or senses the reference line 10. As soon as the scanning beam of the scanning head 27 deviates from the reference line 10, a signal is supplied through line 28 which, via a control 29, delivers a signal through line 30 to the drive means 25. The drive means 25 then moves the scanning head 27 and with it, thus, the welding head 7 into a position, in which the scanning head 27 is again situated exactly above the reference line 10 so that, in turn, the welding head 7 is again exactly located above the welding gap. The control 29 has been merely represented by a block since such controls are well known in the art.

The control of the movement or operation of the welding head 8, to wit, the head located outside the pipe, is somewhat different from that for the welding head 7. This is so because the welding head 8, which is guided at an outer arm 33', operates from the outside and its accurate position is determined by the welding seam 31 which previously has been applied by the welding head 7 and which has to be sensed or scanned by the optical scanning head 32 which is situated within the pipe. The scanning head 32, in the same manner as the scanning head 27 and the welding head 7, is movable on an inner arm 33 within a slide guide 34. The axially stationary inner arm 33 projects from one side into the pipe to be formed, while at its other free end — which in the view of FIG. 4 is on the right-hand side and which is not shown —, is secured so as to be height-adjustable. The arm 33 is moreover supported at the inner surface of the pipe structure by rollers 35 in order to prevent any misalignment due to sagging.

The optical scanning head 32 supplies, through line 36, signals to a control 37 as soon as a deviation occurs between the scanning head 32 and the reference line 10. These signals are converted in the control 37 into two signals, of which one, through line 38, controls the drive means 26 for the welding head 8, while the other signal, through a further line 39, controls a drive 40 which latter is coupled with a slide 41 in which the scanning head 32 is mounted. The last-mentioned signal assures that, through the drive 40, the scanning head 32 is always brought into a position in which the scanning head is situated exactly opposite the reference line 10. Of course, the exactitude of the arrangement is within unavoidable tolerances. The signal which is supplied through line 38 to the drive 26 assures, in turn, that the welding head 8 is moved into a position exactly above the welding seam 31 which has previously been applied by the welding head 7, so that the distance $d$ between the scanning head 32 and the welding head 8 is also constantly maintained.

The embodiments of the invention in which an exclusive property or privilege is claimed are defined as follows:

1. In an arrangement of producing welded helical seam pipe from steel sheet wound into pipe formation, and including means for applying an optically scannable reference line to said sheet so as to extend parallel to one of the edges of the sheet on that face of the sheet which forms the inner surface of the pipe and wherein a first welding head is arranged within the space of the pipe to be welded to apply a first welding seam to the opposing edges of the sheet, while a second welding head is arranged outside said pipe for applying a second welding seam, the improvement which comprises optical scanning means located within said pipe for scanning said reference line and control means operatively connected to said optical scanning means and said first and second welding heads for controlling the movement of said heads in dependence on the scanning information received from said scanning means further comprising tack-welding means for tack-welding said wound sheet before said welding seams are applied.

2. The improvement of claim 1, wherein said scanning means comprises first and second scanning heads located within said pipe, said first scanning head being associated with said first welding head and said second scanning head being associated with said second welding head, first movable support means supporting said first and second scanning heads and said first welding head and being movable within said pipe in a direction parallel to the pipe axis, second movable support means supporting said second welding head outside said pipe and being movable in a direction parallel to said pipe axis, and connecting means operatively connecting said control means to said first and second support means.

3. The improvement of claim 2, wherein said first support means includes first slide means on which said first and second scanning heads and said first welding head are mounted, stationary first track means supporting said first slide means for sliding movement along such first track means, a height-adjustable first support member extending at least partially within said pipe and stationarily supporting said first track means, and first drive means for moving said first slide means and thus said first and second scanning heads and said first welding head along said first track means, said second support means including second slide means on which said second welding head is mounted, stationary second track means supporting said second slide means for sliding movement along said second track means, a second support member extending outside said pipe and stationarily supporting said second track means, and second drive means for moving said second slide means and thus said second welding head along said second track means, said connecting means connecting said control means to said first and second drive means.

4. An arrangement for finish welding a tack-welded helical seam pipe formed from helically wound steel sheet by applying inner and outer welding seams to the tack-welded pipe, in dependence on an optically scannable reference line extending on the inner surface of the pipe, comprising in combination:
   a. a first welding head located within said pipe and adapted to apply said inner welding seam;
   b. a second welding head located outside said pipe and adapted to apply said outer welding seam;
   c. optical scanning means located within said pipe and adapted optically to scan said reference line;
   d. means for supporting and moving said first and second welding heads and said scanning means;
   e. control means for controlling the movements of said welding heads and said scanning means;
   f. connecting means connecting said scanning means with said control means, said control means controlling said movements in response to the scanning information supplied by said scanning means to said control means; and
   g. further comprising tack-welding means for tack-welding said wound sheet before said welding seams are applied.

5. An arrangement as claimed in claim 4, wherein said means d includes a height-adjustable first support member, first track means stationarily mounted on said first support member, first slide means supported for sliding movement along said first track means and supporting said scanning means and said first welding head and a first drive means for moving said first slide means along said first tracks means, said means d further including a second support member, second track means stationarily mounted on said second support member, second slide means supported for sliding movement along said second track means and supporting said second welding head, and a second drive means for moving said second slide means along said second track means, said connecting means connecting said control means to said first and second drive means.

* * * * *

UNITED STATES PATENT OFFICE
CERTIFICATE OF CORRECTION

Patent No. 3861 574          Dated January 21, 1975

Inventor(s) RALF HOFFMANN et al

It is certified that error appears in the above-identified patent and that said Letters Patent are hereby corrected as shown below:

In the heading of the patent, the name and country of the assignee should read:

--[73] Assignee: HOESCH WERKE AKTIENGESELLSCHAFT

Dortmund, GERMANY

Signed and sealed this 15th day of April 1975.

(SEAL)
Attest:

RUTH C. MASON
Attesting Officer

C. MARSHALL DANN
Commissioner of Patents
and Trademarks